United States Patent
Yao et al.

(10) Patent No.: US 7,030,053 B2
(45) Date of Patent: Apr. 18, 2006

(54) CATALYST COMPOSITION COMPRISING RUTHENIUM AND A TREATED SILICA SUPPORT COMPONENT AND PROCESSES THEREFOR AND THEREWITH FOR PREPARING HIGH MOLECULAR WEIGHT HYDROCARBONS SUCH AS POLYMETHYLENE

(75) Inventors: Jianhua Yao, Bartlesville, OK (US); James B. Kimble, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 171 days.

(21) Appl. No.: 10/289,014

(22) Filed: Nov. 6, 2002

(65) Prior Publication Data

US 2004/0087672 A1 May 6, 2004

(51) Int. Cl.
- *B01J 21/08* (2006.01)
- *B01J 21/12* (2006.01)
- *B01J 21/14* (2006.01)
- *B01J 23/40* (2006.01)
- *B01J 23/42* (2006.01)

(52) U.S. Cl. ..................... 502/261; 502/326
(58) Field of Classification Search ............... 502/261, 502/326, 407, 439; 501/54, 55, 133
See application file for complete search history.

(56) References Cited

U.S. PATENT DOCUMENTS

| | | | | |
|---|---|---|---|---|
| 2,632,014 A | | 3/1953 | Gresham | |
| 3,880,776 A | * | 4/1975 | Box et al. | 502/329 |
| 3,909,394 A | * | 9/1975 | Hayes | 208/139 |
| 3,956,185 A | * | 5/1976 | Yagi et al. | 502/241 |
| 3,965,040 A | * | 6/1976 | Kobylinski et al. | 502/213 |
| 4,101,450 A | * | 7/1978 | Hwang et al. | 502/261 |
| 4,122,039 A | * | 10/1978 | Kobylinski et al. | 502/213 |
| 4,179,407 A | * | 12/1979 | Iiyama et al. | 502/178 |
| 4,259,262 A | * | 3/1981 | Drake | 564/491 |
| 4,350,615 A | * | 9/1982 | Meguerian et al. | 502/66 |
| 4,405,499 A | | 9/1983 | Tsang et al. | |
| 4,436,838 A | | 3/1984 | Lin | |
| 4,477,595 A | | 10/1984 | Madon | |
| 4,493,905 A | | 1/1985 | Beuther et al. | |
| 4,495,373 A | * | 1/1985 | Niwa et al. | 585/269 |
| 4,497,908 A | | 2/1985 | Lewis et al. | |
| 4,588,705 A | * | 5/1986 | Vanderspurt et al. | 502/177 |
| 4,622,308 A | | 11/1986 | Koikeda et al. | |
| 4,670,472 A | | 6/1987 | Dyer et al. | |
| 4,681,867 A | | 7/1987 | Dyer et al. | |
| 4,791,091 A | * | 12/1988 | Bricker et al. | 502/303 |
| 4,863,890 A | * | 9/1989 | Koll | 502/230 |
| 4,904,700 A | | 2/1990 | Sapienza et al. | |
| 4,904,817 A | * | 2/1990 | Steinmetz | 560/80 |
| 4,925,824 A | | 5/1990 | Sapienza et al. | |
| 4,960,941 A | * | 10/1990 | Vedage et al. | 564/450 |
| 4,992,587 A | * | 2/1991 | Koll | 564/398 |
| 5,059,574 A | * | 10/1991 | Abrevaya | 502/261 |
| 5,202,299 A | * | 4/1993 | Symons et al. | 502/242 |
| 5,227,407 A | | 7/1993 | Kim | |
| 5,372,849 A | | 12/1994 | McCormick et al. | |
| 5,424,264 A | * | 6/1995 | Richard et al. | 502/261 |
| 5,879,539 A | * | 3/1999 | Mignard et al. | 208/138 |
| 5,908,607 A | * | 6/1999 | Abekawa et al. | 423/502 |
| 5,973,210 A | * | 10/1999 | Jacquot et al. | 568/484 |
| 6,048,993 A | | 4/2000 | Grubbs et al. | |
| 6,121,187 A | * | 9/2000 | Maier | 502/232 |
| 6,235,677 B1 | * | 5/2001 | Manzer et al. | 502/232 |
| 6,372,687 B1 | * | 4/2002 | Hagemeyer et al. | 502/326 |
| 6,403,844 B1 | * | 6/2002 | Zhang et al. | 568/864 |
| 6,548,711 B1 | * | 4/2003 | Yamamoto et al. | 568/341 |
| 6,652,978 B1 | * | 11/2003 | Knasiak et al. | 428/450 |
| 6,733,657 B1 | * | 5/2004 | Benazzi et al. | 208/110 |
| 6,740,615 B1 | * | 5/2004 | Zhou | 502/29 |
| 6,753,292 B1 | * | 6/2004 | Yamaoka et al. | 502/242 |

\* cited by examiner

*Primary Examiner*—Cam N. Nguyen
(74) *Attorney, Agent, or Firm*—Jeffrey R. Anderson

(57) ABSTRACT

A catalyst composition and a process of using a catalyst composition for preparing high molecular weight hydrocarbons, such as polymethylene, from a fluid containing hydrogen and carbon monoxide are disclosed. The catalyst composition contains ruthenium and a treated silica support component. The treated silica support component is prepared by a process including contacting a silica support component, such as silicon dioxide, and a treating agent, such as a silicon-containing compound.

4 Claims, No Drawings

US 7,030,053 B2

CATALYST COMPOSITION COMPRISING RUTHENIUM AND A TREATED SILICA SUPPORT COMPONENT AND PROCESSES THEREFOR AND THEREWITH FOR PREPARING HIGH MOLECULAR WEIGHT HYDROCARBONS SUCH AS POLYMETHYLENE

BACKGROUND OF THE INVENTION

The present invention relates to a process of preparing high molecular weight hydrocarbons, such as polymethylene, in the presence of a catalyst composition.

It is known that reacting synthesis gas, a mixture of carbon monoxide and hydrogen, at very high pressures, for example greater than 15,000 pounds per square inch gauge (psig), and at temperatures of from about 100° C. to about 500° C. in the presence of supported catalysts can provide high molecular weight hydrocarbons such as polymethylene. However, the pressures required to produce such products from synthesis gas are difficult to achieve, require specific equipment, involve many safety issues, and have a negative impact on the economics of the process. Thus, production of high molecular weight hydrocarbons, such as polymethylene, utilizing moderate reaction conditions that do not require high pressures and related equipment needed to handle the high pressures would be a significant contribution to the art and to the economy.

It is also known that a serious problem associated with synthesis gas operations has been the non-selectivity of the product distribution since high activity catalysts generally yield a liquid product containing numerous hydrocarbon materials such as methanol and branched chain higher alcohols. Thus, complicated recovery schemes are necessary to separate the desired products and the overall yield of the valuable organic products is low. Thus, a process which can produce high molecular weight hydrocarbons, such as polymethylene, from synthesis gas to provide a high degree of selectivity to polymethylene would also be of significant contribution to the art and to the economy.

It is also known that supported ruthenium catalyst compositions have been used at high pressure reaction conditions for producing polymethylene from synthesis gas. However, such catalyst compositions require the use of high pressures and are not useful for obtaining a high yield of polymethylene from synthesis gas conversion at moderate reaction conditions. Thus, a supported ruthenium catalyst composition, a process of making such catalyst composition, and a process for using such catalyst composition for producing polymethylene from synthesis gas that provides a high yield of polymethylene at moderate reaction conditions compared to supported ruthenium catalyst compositions utilized at high pressure conditions would also be of significant contribution to the art and to the economy.

SUMMARY OF THE INVENTION

It is an object of the present invention to provide a process for contacting, under reaction conditions, a catalyst composition, comprising ruthenium and a treated silica support component, and a fluid comprising hydrogen and carbon monoxide to provide high molecular weight hydrocarbons, such as polymethylene, where moderate reaction conditions can be utilized.

Another object of the present invention is to provide a process that comprises contacting a catalyst composition, comprising ruthenium and a treated silica support component, and a fluid comprising hydrogen and carbon monoxide wherein such process provides a yield of reaction products such as polymethylene that is higher compared to catalyst compositions that do not comprise a treated silica support component prepared according to a process of the present invention.

Another object of the present invention is to provide novel catalyst compositions and processes of producing such catalyst compositions that can be utilized in the production of high molecular weight hydrocarbons, such as polymethylene, from the conversion of fluids comprising hydrogen and carbon monoxide.

An embodiment of the present invention comprises a process comprising contacting, under reaction conditions, a catalyst composition and a fluid comprising hydrogen and carbon monoxide. The catalyst composition comprises ruthenium and a treated silica support component. Such a process utilizes moderate reaction conditions.

Another embodiment of the present invention comprises a catalyst composition comprising ruthenium and a treated silica support component. Such catalyst composition can be prepared by a process comprising contacting a ruthenium component and a treated silica support component that provides for a catalyst composition that can be contacted with a fluid comprising hydrogen and carbon monoxide to provide for high molecular weight hydrocarbons such as polymethylene.

Other objects and advantages of the present invention will become apparent from the detailed description and the appended claims.

DETAILED DESCRIPTION OF THE INVENTION

It has been discovered that a novel catalyst composition comprising ruthenium and a treated silica support component can be contacted with a fluid comprising hydrogen and carbon monoxide to provide for high molecular weight hydrocarbons such as polymethylene that can be utilized under moderate reaction conditions. Further, such catalyst composition provides for higher yields of such high molecular weight hydrocarbons compared to currently used catalyst compositions such as ruthenium on a silica support component that has not been treated according to a process of the present invention.

The term "high molecular weight hydrocarbon" as referred to herein includes any hydrocarbon having a molecular weight greater than about $2 \times 10^3$ molecular weight units (mwu) that can be prepared by a process of the present invention comprising contacting a fluid comprising hydrogen and carbon monoxide with a catalyst composition of the present invention comprising ruthenium and a treated silica support component. The term "polymethylene" as referred to herein includes any hydrocarbon materials comprised substantially of methylene ($CH_2$) fragments catenated or linked in long chains. The long chains may contain branches. The polymethylene material comprises a mixture of various molecular weights.

The term "treated silica support component" as referred to herein comprises a support component of a catalyst composition of the present invention that comprises silica and has been treated according to a process of the present invention.

A catalyst composition of the present invention comprises ruthenium and a treated silica support component. In preparing a catalyst composition of the present invention, the ruthenium is initially present as a ruthenium component. A ruthenium component of the present invention can be any ruthenium component that suitably provides for a catalyst composition of the present invention comprising ruthenium that can be utilized in a process for preparing polymethylene according to a process of the present invention. Examples of a suitable ruthenium component include, but are not limited to, ruthenium bromide, ruthenium bromide hydrate, ruthenium chloride, ruthenium chloride hydrate, ruthenium iodide, ruthenium nitrosyl nitrate, ruthenium oxide, ruthenium oxide hydrate, and the like and combinations thereof. Examples of a preferred ruthenium component that can be utilized in preparing a catalyst composition of the present invention include, but are not limited to, ruthenium chloride, ruthenium chloride hydrate, or ruthenium nitrosyl nitrate. A more preferred ruthenium component is ruthenium chloride hydrate. It should be understood that the ruthenium component may be converted to ruthenium during a process of preparing a catalyst composition of the present invention.

A silica support component that is treated according to a process of the present invention to provide a treated silica support component of a catalyst composition of the present invention can be any silica support component that suitably provides for a catalyst composition of the present invention that can be utilized in a process of preparing polymethylene according to a process of the present invention. Examples of a suitable silica support component include, but are not limited to, silicon dioxide, silica, colloidal silica, silica gel, silicon, silicon carbide, silicon monoxide, silicon nitride, silicon tetraboride, silicon tetrabromide, silicon tetrachloride, and the like and combinations thereof. Preferably, a silicon support component is silicon dioxide.

A silica support component that is treated according to a process of the present invention to provide a treated silica support component of a catalyst composition of the present invention generally has a surface area in the range of from about 5 m$^2$/g (measured by the Brunauer, Emmett, Teller method, i.e., BET method) to about 1000 m$^2$/g, preferably in the range of from about 10 m$^2$/g to about 750 m$^2$/g, and more preferably in the range of from about 25 m$^2$/g to about 600 m$^2$/g.

A silica support component that is treated according to a process of the present invention to provide a treated silica support component of a catalyst composition of the present invention generally has a pore volume in the range of from about 0.05 mL/g to about 2 mL/g, preferably in the range of from about 0.10 mL/g to about 1.5 mL/g, and more preferably in the range of from about 0.20 mL/g to about 1 mL/g.

A silica support component that is treated according to a process of the present invention to provide a treated silica support component of a catalyst composition of the present invention can have any suitable shape or form. Preferably, a silica support component is in the form of tablets, pellets, extrudates, spheres, and the like and combinations thereof. A silica support component that is treated according to a process of the present invention generally has a particle size in the range of from about 50 micrometers (microns) to about 10 millimeters (mm), preferably in the range of from about 55 micrometers to about 8 mm, and more preferably in the range of from about 60 micrometers to about 6 mm.

An amount of ruthenium component utilized in a process of preparing a catalyst composition of the present invention is such as to provide a concentration of ruthenium in a catalyst composition of the present invention that suitably provides for a catalyst composition of the present invention that can be utilized in preparing polymethylene from a fluid comprising hydrogen and carbon monoxide. An amount of ruthenium component is such as to provide a concentration of ruthenium in a catalyst composition of the present invention generally in the range of from about 1 weight percent to about 30 weight percent based on the total weight of the catalyst composition, preferably in the range of from about 5 weight percent to about 25 weight percent, and more preferably in the range of from about 10 weight percent to about 20 weight percent.

A treating agent of the present invention, also referred to as a silylating agent, can be any suitable silicon-containing compound that effectively treats a silica support component of the present invention so as to provide a treated silica support component, also referred to as a silylated silica support component, that is effective in providing for a catalyst composition of the present invention that can be utilized in preparing polymethylene from a fluid comprising hydrogen and carbon monoxide. More particularly, a treating agent can be an organosilicon compound selected from compounds having the following formulas:

$$SiR_yX_{4-y},$$

$$(R_wX_{3-w}Si)_2.Z,$$

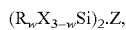

$$[SiR_mOX_{2-m}]_n,$$

$[SiR_mX_{2-m}]_n$, and combinations of any two or more thereof, wherein:
y=1 to 4;
w=1 to 3;
m=1 to 2;
n>2, preferably >5, and more preferably in the range of from 10 to 5,000,000;
R=alkyl, aryl, H, alkoxy, aryloxy, arylalkyl, alkylaryl; when y≧2 or w≧2 or m=2, R can be same or different and is independently selected from the groups listed;
X=halide; and
Z=oxygen or imino or alkylimino or alkanoylimino.

Examples of a preferred treating agent include, but are not limited to, tetraalkyl orthosilicates, poly(alkylaryl)siloxanes, and combinations thereof. The more preferred treating agents include, but are not limited to, tetraethyl orthosilicate (TEOS), also known as tetraethoxysilane, poly(methylphenyl)siloxane, and combinations thereof. Most of these treating agents are commercially available.

Contacting of a treating agent and a silica support component can be conducted by any manner or method(s) that provides for a treated silica support component that can be utilized in a catalyst composition of the present invention for preparing polymethylene from a fluid comprising hydrogen and carbon monoxide. Examples of suitable contacting include, but are not limited to, impregnation, mixing, and the like and combinations thereof. Generally, contacting a treating agent and a silica support component according to a process of the present invention comprises any impregnation technique known in the art. A preferred impregnation technique is "incipient wetness impregnation" that includes essentially completely filling the pores of the silica support component with a solution of the treating agent. The solution may be an aqueous solution, an alcohol-containing solution, or a hydrocarbon solution of the treating agent. It is preferred, however, for the treating agent to be insoluble in water but soluble in an alcohol or hydrocarbon. Examples of a suitable aqueous solution include, but are limited to, deionized water. Examples of a suitable alcohol include, but are not limited to, methyl alcohol, ethyl alcohol, isopropyl alcohol, butyl alcohol, and the like and combinations thereof. A preferred alcohol is methyl alcohol. Examples of a suitable hydrocarbon solvent include, but are not limited to, aromatics and other hydrocarbons having from about 4 to about 10 carbon atoms per molecule including alkanes, cycloalkanes, and olefins. The more preferred hydrocarbon solvent is cyclohexane. The more preferred solution of the treating agent is an alcohol-containing solution comprising the treating agent and an alcohol, preferably methyl alcohol.

The concentration of treating agent in the solution can range upwardly to the solubility limit of the treating agent in the solvent. Generally, the concentration of a treating agent in the solution can be in the range of from about 1 weight percent to about 99 weight percent, preferably in the range of from about 5 weight percent to about 50 weight percent, and more preferably in the range of from about 5 weight percent to about 25 weight percent. Generally, a weight ratio of treating agent to a silica support component is generally in the range of from about 0.01:1 to about 3:1, preferably in the range of from about 0.1:1 to about 2:1, and more preferably in the range of from about 0.1:1 to about 1:1.

The amount of treating agent contacted with a silica support component as described herein is any amount that suitably provides for a treated silica support component that can be utilized in a catalyst composition of the present invention for preparing polymethylene from a fluid comprising hydrogen and carbon monoxide. Generally, the amount of treating agent present in a catalyst composition of the present invention is in the range of from about 0.5 weight percent to about 20 weight percent based on the total weight of the catalyst composition, preferably in the range of from about 0.5 weight percent to about 5 weight percent, and more preferably in the range of from about 1 weight percent to about 5 weight percent.

After contacting a treating agent and a silica support component as described herein, the resulting silica support component containing a treating agent is subjected to drying under a first drying condition. A "first drying condition" as referred to herein includes a temperature generally in the range of from about 20° C. to about 90° C., preferably in the range of from about 20° C. to about 80° C., and more preferably in the range of from about 25° C. to about 70° C. A first drying condition further comprises a pressure generally in the range of from about 0 pounds per square inch absolute (psia) to about 200 psia, preferably in the range of from about 1 psia to about 150 psia, and more preferably in the range of from about 2 psia to about 100 psia. A first drying condition further comprises a time period generally in the range of from about 0.5 hour to about 30 hours, preferably in the range of from about 0.5 hour to about 25 hours, and more preferably in the range of from about 1 hour to about 20 hours. A first drying condition further comprises an atmosphere, suitable for drying as described herein, preferably air.

A process of preparing a treated silica support component that can be utilized as a support component of a catalyst composition of the present invention further comprises calcining under a calcining condition. A "calcining condition" as referred to herein includes a temperature generally in the range of from about 250° C. to about 1000° C., preferably in the range of from about 300° C. to about 800° C., and more preferably in the range of from about 400° C. to about 600° C. A calcining condition further comprises a pressure generally in the range of from about 0 pounds per square inch absolute (psia) to about 750 psia, preferably in the range of from about 1 psia to about 600 psia, and more preferably in the range of from about 2 psia to about 500 psia. A calcining condition further comprises a time period generally in the range of from about 0.5 hour to about 30 hours, preferably in the range of from about 1 hour to about 20 hours, and more preferably in the range of from about 1 hour to about 10 hours. The calcining can be done in an oxygen-containing atmosphere (e.g., air). During calcining, substantially all volatile matter (e.g., water and carbonaceous materials) is removed.

Contacting of a ruthenium component and a treated silica support component comprises any contacting manner or method(s) that suitably provides for a catalyst composition of the present invention. Examples of suitable contacting include, but are not limited to, impregnation, mixing, and the like and combinations thereof. Generally, contacting a ruthenium component and a treated silica support component according to a process of the present invention comprises any impregnation technique known in the art. A preferred impregnation technique is "incipient wetness impregnation" that includes essentially completely filling the pores of the treated silica support component with a solution containing a ruthenium component of the present invention.

The ruthenium component of the present invention can be contacted with the treated silica support component of the present invention in any suitable manner so long as a catalyst composition of the present invention can be prepared. Generally, the treated silica support is first impregnated with a ruthenium component dissolved in an aqueous solution such as deionized water, by incipient wetness impregnation. The treated silica support component can also be sprayed with an impregnating solution containing a dissolved ruthenium component. Generally, the concentration of the ruthenium component in the impregnating solution is in the range of from about 0.01 gm/mL to about 1 gm/mL, preferably in the range of from about 0.02 gm/mL to about 0.5 gm/mL. The presently preferred ruthenium component to be used in the impregnating solution is ruthenium chloride hydrate. Examples of a suitable solvent of the impregnating solution include, but are not limited to, deionized water, an alcohol as described herein, and the like and combinations thereof. The amounts of ruthenium component utilized are amounts suitable to provide concentrations as described herein of ruthenium in a catalyst composition of the present invention.

After contacting a ruthenium component and a treated silica support component as described herein, the resulting treated silica support component containing a ruthenium component is subjected to drying under a second drying condition. A "second drying condition" as referred to herein is similar to a first drying condition as described herein except that the first drying condition includes lower temperatures and longer time periods than a second drying condition. A second drying condition as referred to herein includes a temperature generally in the range of from about 20° C. to about 200° C., preferably in the range of from about 50° C. to about 175° C., and more preferably in the range of from about 75° C. to about 150° C. A second drying condition further comprises a pressure generally in the range of from about 0 pounds per square inch absolute (psia) to about 200 psia, preferably in the range of from about 1 psia to about 150 psia, and more preferably in the range of from about 2 psia to about 100 psia. A second drying condition further comprises a time period generally in the range of from about 0.5 hour to about 20 hours, preferably in the range of from about 0.5 hour to about 15 hours, and more preferably in the range of from about 1 hour to about 10 hours. A second drying condition further comprises an atmosphere, suitable for drying as described herein, preferably air.

After drying under a second drying condition, or in lieu of drying under a second drying condition, the resulting treated silica support component containing a ruthenium component, preferably the resulting dried, treated silica support component containing a ruthenium component, is calcined under a calcining condition as described herein.

A process of preparing a catalyst composition of the present invention further comprises, after contacting a ruthenium component and a treated silica support component as described herein, activating under an activating condition that suitably provides for a catalyst composition that can be utilized in a process of the present invention for producing polymethylene from a fluid comprising hydrogen and carbon monoxide. Preferably, after contacting a ruthenium component and a treated silica support component as described herein, the resulting composition is dried under a second drying condition as described herein and calcined under a calcining condition as described herein before activating under an activating condition as described herein. An "activating condition" as referred to herein includes a temperature generally in the range of from about 50° C. to about 500° C., preferably in the range of from about 60° C. to about 400° C., and more preferably in the range of from about 70° C. to about 300° C. An activating condition further comprises a pressure generally in the range of from about 0 pounds per square inch absolute (psia) to about 750 psia, preferably in the range of from about 1 psia to about 500 psia, and more preferably in the range of from about 2 psia to about 400 psia. An activating condition as referred to herein further comprises a time period generally in the range of from about 0.1 hour to about 30 hours, preferably in the range of from about 0.5 hour to about 20 hours, and more preferably in the range of from about 1 hour to about 10 hours. An activating condition further comprises an atmosphere suitable for activating a catalyst composition of the present invention. Examples of a suitable atmosphere include, but are not limited to, hydrogen, carbon monoxide, synthesis gas, other reducing gases, and the like and combinations thereof. A preferred atmosphere is hydrogen.

A weight ratio of total silicon dioxide (includes the treating agent that is converted to silicon dioxide as well as silicon dioxide contained in, or converted from, the initial silica support component that is treated) to ruthenium of a catalyst composition of the present invention can be any weight ratio that suitably provides for a catalyst composition of the present invention that can be utilized in a process of the present invention to prepare polymethylene from a fluid comprising hydrogen and carbon monoxide. Generally, the weight ratio of total silicon dioxide to ruthenium of a catalyst composition of the present invention is generally in the range of from about 0.01:1 to about 20:1, preferably in the range of from about 0.1:1 to about 15:1, and more preferably in the range of from about 0.5:1 to about 10:1.

A catalyst composition of the present invention can be used in a process of the present invention comprising contacting, under reaction conditions, a catalyst composition with a fluid comprising hydrogen and carbon monoxide. The term "fluid" as referred to herein denotes gas, liquid, vapor, and combinations thereof.

Generally, a mole ratio of hydrogen to carbon monoxide can be any mole ratio that provides for a fluid that can be contacted with a catalyst composition of the present invention to provide high molecular weight hydrocarbons, preferably polymethylene. Generally, the mole ratio of hydrogen to carbon monoxide is in the range of from about 1:1 to about 5:1, preferably in the range of from about 1:1 to about 4:1, more preferably in the range of from about 1:1 to about 3:1, and most preferably the mole ratio is about 2:1.

Reaction conditions of a process of the present invention can be any reaction conditions that suitably provide for the production of polymethylene from a fluid comprising hydrogen and carbon monoxide according to a process of the present invention. The reaction conditions generally comprise a temperature generally in the range of from about 100° C. to about 500° C., preferably in the range of from about 100° C. to about 400° C., and more preferably in the range of from about 100° C. to about 300° C. The reaction conditions further comprise a pressure generally in the range of from about 500 pounds per square inch gauge (psig) to about 10,000 psig, preferably in the range of from about 750 psig to about 7500 psig, and more preferably in the range of from about 1000 psig to about 5000 psig. The reaction conditions further comprise a charge rate of fluid such that the weight hourly space velocity is generally in the range of from about 0.01 hour$^{-1}$ to about 1000 hour$^{-1}$, preferably in the range of from about 0.05 hour$^{-1}$ to about 750 hour$^{-1}$, and more preferably in the range of from about 0.1 hour$^{-1}$ to about 500 hour$^{-1}$.

A process of the present invention can further comprise contacting the catalyst composition and the fluid comprising hydrogen and carbon monoxide in the presence of a solvent. Examples of a suitable solvent include, but are not limited to, cyclopentane, cyclohexane, cycloheptane, cyclooctane, and the like and combinations thereof, preferably cyclohexane. Generally, a weight ratio of solvent to catalyst composition can be any weight ratio that provides for the preparation of polymethylene from a fluid comprising hydrogen and carbon monoxide. A weight ratio of solvent, preferably cyclohexane, to catalyst composition is generally in the range of from about 400:1 to about 20:1, preferably in the range of from about 300:1 to about 50:1, and more preferably in the range of from about 200:1 to about 80:1.

The fluid comprising hydrogen and carbon monoxide can be contacted by any suitable means, method(s), or manner with a catalyst composition of the present invention as described herein contained within a reaction zone. The contacting step can be operated as a batch process step or, preferably, as a continuous process step, preferably in a slurry phase reactor. In the latter operation, a solid catalyst bed, a moving catalyst bed, a fluidized catalyst bed, or a bubble slurry bed can be employed. Any of these operational modes have advantages and disadvantages, and those skilled in the art can select the one most suitable for particular fluid and catalyst composition. The contacting step is preferably carried out within a reaction zone comprising a slurry phase reactor, wherein is contained a catalyst composition of the present invention, and under reaction conditions that suitably promote the production of polymethylene from at least a portion of the fluid.

Generally, the process effluent from the reaction zone or contacting zone, can be separated into the principal fractions such as high molecular weight hydrocarbons comprising polymethylene and lighter fractions such as alcohols and lower molecular weight hydrocarbons, by any known method(s) such as, for example, fractionation distillation. Because the separation methods are well-known to one skilled in the art, the description of such separation methods is omitted herein.

After a catalyst composition of the present invention has been deactivated by, for example, coke deposition or feed poisons, to the extent that the fluid conversion and/or the selectivity to polymethylene has become unsatisfactory, the catalyst composition of the present invention can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of calcining depend generally on the types and amounts of deactivating deposits on the catalyst composition and on the calcination temperatures. These optimal time periods can easily be determined by those possessing ordinary skill in the art and are omitted herein for the interest of brevity.

The following examples are presented to further illustrate the present invention and are not to be construed as unduly limiting the scope of the present invention.

EXAMPLE I

This example illustrates the preparation of catalyst compositions that were subsequently tested as catalysts in the preparation of polymethylene.

Catalyst A: A 5.0 gram quantity of silica gel (obtained from Aldrich Chemical Company, Milwaukee, Wis. with a product designation 28,862-4) having a surface area (measured by the Brunauer Emmett Teller method, i.e., BET method) of 500 $m^2/g$ and a pore volume of 0.75 $cm^2/g$ was subjected to multiple impregnations using a ruthenium chloride hydrate solution of a 2.24 gram quantity of ruthenium chloride hydrate ($RuCl_3 \cdot xH_2O$) (obtained from Alfa-Aesar, Wardhill, Mass. with a product designation 11043) mixed with approximately 80 mL of deionized water. The ruthenium chloride hydrate solution was added to the 5.0 gram quantity of silica gel in an amount that completely filled the pores of the silica gel, i.e., an amount that provided for an incipient wetness impregnation of the silica gel, followed by drying in a vacuum oven at about 120° C. for about 2 hours. The steps of adding the ruthenium chloride hydrate solution to the 5.0 gram quantity of silica gel in an amount that completely filled the pores of the silica gel followed by drying in a vacuum oven at about 120° C. for about 2 hours was repeated until the entire amount of ruthenium chloride hydrate solution had been utilized. The resulting material was then calcined in air at a temperature of about 450° C. for about 4 hours.

Catalyst B: A 7.44 gram quantity of tetraethyl orthosilicate (TEOS) (obtained from Aldrich Chemical Company, Milwaukee, Wis. with a product designation 13,190-3) was mixed with a 10 gram quantity of methyl alcohol to provide a solution of TEOS and methyl alcohol. The solution was then used to impregnate a 10 gram quantity of silicon dioxide (obtained from Aldrich Chemical Company, Milwaukee, Wis. with a product designation 28,862-4) having a surface area (measured by the Brunauer Emmett Teller method, i.e., BET method) of 500 $m^2/g$ and a pore volume of 0.75 $cm^2/g$ using an incipient wetness impregnation technique, i.e., essentially completely filling the pores of the silicon dioxide, with the solution of TEOS and methyl alcohol. After contacting, the resulting composition was dried at about 25° C. for about 16 hours at atmospheric pressure followed by calcining in air at a temperature of about 550° C. for about 2 hours to provide for a treated silica support component. A 5.0 gram quantity of the treated silica support component was then subjected to multiple impregnations using a ruthenium chloride hydrate solution of a 2.24 gram quantity of ruthenium chloride hydrate ($RuCl_3 \cdot xH_2O$) (obtained from Alfa-Aesar, Wardhill, Mass. with a product designation 11043) mixed with approximately 80 mL of deionized water. The ruthenium chloride hydrate solution was added to the 5.0 gram quantity of treated silica support component in an amount that completely filled the pores of the treated silica support component, i.e., an amount that provided for an incipient wetness impregnation of the treated silica support component, followed by drying in a vacuum oven at about 120° C. for about 2 hours. The steps of adding the ruthenium chloride hydrate solution to the 5.0 gram quantity of treated silica support component in an amount that completely filled the pores of the treated silica support component followed drying in a vacuum oven at about 120° C. for about 2 hours was repeated until the entire amount of ruthenium chloride hydrate solution had been utilized. The resulting material was then calcined in air at a temperature of about 450° C. for about 4 hours.

EXAMPLE II

This example illustrates the use of the catalyst compositions described in Example I as catalyst compositions in the preparation of high molecular weight hydrocarbons, such as polymethylene, from a fluid comprising hydrogen and carbon monoxide.

An approximately 2.0 gram sample of each of the catalyst compositions A and B described in Example I was reduced at about 250° C. for about two hours with hydrogen. For each test, approximately 1.85 grams of each reduced sample were placed into a 300 cc stainless steel autoclave (Autoclave Engineer, Inc., Erie, Pa., Model BC00305505AH, pressure range: less than 6000 psig at 650° F.) with about 180 mL of cyclohexane. The reactor was closed and purged with nitrogen by pressurizing to 300 psig and then depressurizing to 0 psig over a time period of about 5 minutes. The nitrogen pressurizing and depressurizing was repeated five times. The reactor was then purged in a similar manner five times with a fluid containing hydrogen and carbon monoxide in a 2:1 mole ratio. The reactor was then pressurized to 300 psig with a fluid containing hydrogen and carbon monoxide in a 2:1 mole ratio and allowed to mix, with the mixer at 500 revolutions per minute, for about 10 minutes followed by depressurizing to 0 psig over a time period of about 5 minutes. The pressurizing and depressurizing to 300 psig with a fluid containing hydrogen and carbon monoxide along with mixing was repeated. After purging, the reactor was pressurized to 1500 psig with a fluid containing hydrogen and carbon monoxide in a 2:1 mole ratio along with cyclohexane as the solvent and heated to about 150° C. with the mixer at 500 revolutions per minute. The pressure of the reactor was maintained at 1500 psig by adding the fluid containing hydrogen and carbon monoxide. After about seven hours, the reaction was stopped and the cyclohexane, polymer, and catalyst composition were recovered and analyzed by gas chromatography and gel permeation chromatography. Results of the tests for catalyst compositions A and B are summarized herein in Table I. The productivity of the catalyst composition is reported as gm/gm catalyst/hr, which is grams of polymethylene produced per gram of catalyst composition per hour.

TABLE I

| CATALYST | CATALYST DESCRIPTION | POLYMETHYLENE PRODUCTIVITY (gm/gm catalyst/hr) | PERCENTAGE INCREASE IN POLYMETHYLENE PRODUCTIVITY COMPARED TO CATALYST A (%) |
|---|---|---|---|
| A | 15% Ru/ Untreat- | 0.0494 | — |

TABLE I-continued

| CATALYST | CATALYST DESCRIPTION | POLYMETHYLENE PRODUCTIVITY (gm/gm catalyst/hr) | PERCENTAGE INCREASE IN POLYMETHYLENE PRODUCTIVITY COMPARED TO CATALYST A (%) |
|---|---|---|---|
| B | ed Silica Support 15% Ru/ Treated Silica Support | 0.0571 | 16 |

The test data presented in Table I clearly show that a catalyst composition comprising ruthenium and a treated silica support component prepared according to a process of the present invention clearly produces more polymethylene compared to a catalyst composition comprising ruthenium and an untreated silica support component.

The results shown in the above examples clearly demonstrate that the present invention is well adapted to carry out the objects and obtain the ends and advantages mentioned as well as those inherent therein.

Reasonable variations, modifications, and adaptations can be made within in the scope of the disclosure and the appended claims without departing from the scope of the present invention.

What is claimed is:

1. A composition comprising ruthenium and a treated silica support component wherein said treated silica support component is prepared by a process comprising contacting a silica support component and a treating agent and further wherein said contacting is selected from the group consisting of impregnation, mixing, and combinations thereof; wherein said catalyst composition comprises a weight ratio of total silicon dioxide to ruthenium in the range of from about 0.01:1 to about 20:1; wherein said treating agent comprises an organosilicon compound having the following formulas:

$SiR_yX_{4-y}$, $(R_wX_{3-w}Si)_2.Z$, $[SiR_mOX_{2-m}]_n$, $[SiR_mX_{2-m}]_n$, and combinations of any two or more thereof, wherein:
  y=1 to 4;
  w=1 to 3;
  m=1 to 2;
  n>2, preferably >5, and more preferably in the range of from 10 to 5,000,000;
  R=alkyl, aryl, H, alkoxy, aryloxy, arylalkyl, alkylaryl; when $y \geq 2$ or $w \geq 2$ or m=2,
  R can be same or different and is independently selected from the groups listed;
  X=halide; and
  Z=oxygen or imino or alkylimino or alkanoylimino.

2. A composition according to claim 1 wherein said silica support component is selected from the group consisting of silicon dioxide, silica, colloidal silica, silica gel, silicon, silicon carbide, silicon monoxide, silicon nitride, silicon tetraboride, silicon tetrabromide, silicon tetrachloride, and combinations thereof.

3. A composition according to claim 1 wherein said treating agent is selected from the group consisting of tetraalkyl orthosilicates, poly(alkylaryl)siloxanes, and combinations thereof.

4. A composition according to claim 3 wherein said treating agent is selected from the group consisting of tetraethyl orthosilicate, poly(methylphenyl)siloxane, and combinations thereof.

* * * * *